(12) United States Patent
Eddaoudi et al.

(10) Patent No.: US 10,781,387 B2
(45) Date of Patent: Sep. 22, 2020

(54) METAL ORGANIC FRAMEWORKS FOR REMOVAL OF COMPOUNDS FROM A FLUID

(71) Applicants: King Abdullah University of Science and Technology, Thuwal (SA); Saudi Arabian Oil Company, Dhahran (SA)

(72) Inventors: Mohamed Eddaoudi, Thuwal (SA); Youssef Belmabkhout, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 136 days.

(21) Appl. No.: 15/506,331

(22) PCT Filed: Aug. 25, 2015

(86) PCT No.: PCT/US2015/046756
§ 371 (c)(1),
(2) Date: Feb. 24, 2017

(87) PCT Pub. No.: WO2016/033086
PCT Pub. Date: Mar. 3, 2016

(65) Prior Publication Data
US 2017/0247622 A1    Aug. 31, 2017

Related U.S. Application Data

(60) Provisional application No. 62/041,516, filed on Aug. 25, 2014.

(51) Int. Cl.
*B01D 53/72* (2006.01)
*B01D 53/02* (2006.01)
(Continued)

(52) U.S. Cl.
CPC .............. *C10L 3/104* (2013.01); *B01D 53/02* (2013.01); *B01D 53/04* (2013.01); *B01J 20/226* (2013.01);
(Continued)

(58) Field of Classification Search
None
See application file for complete search history.

(56) References Cited

U.S. PATENT DOCUMENTS

| 9,102,691 B2 | 8/2015 | Zhou et al. |
| 9,724,668 B2 | 8/2017 | Zhou et al. |
| 10,322,402 B2 | 6/2019 | Alezi et al. |

FOREIGN PATENT DOCUMENTS

WO    2016033086 A1    3/2016

OTHER PUBLICATIONS

"International Search Report and Written Opinion", International Application No. PCT/US2015/046756, dated Nov. 2, 2015, 10 pages.
(Continued)

*Primary Examiner* — Daniel Berns
(74) *Attorney, Agent, or Firm* — Billion & Armitage; Gregory S. Schwartz

(57) ABSTRACT

Embodiments provide a method of compound removal from a fluid. The method includes contacting one or more metal organic framework (MOF) compositions with a fluid and sorbing one or more compounds, such as $CO_2$, $H_2S$ and condensable hydrocarbons. One or more of $CO_2$, $H_2S$ and condensable hydrocarbons can be sorbed simultaneously or in series. The metal organic framework can be an M-soc-MOF.

19 Claims, 4 Drawing Sheets

(51) Int. Cl.
- B01D 53/14 (2006.01)
- B01D 53/44 (2006.01)
- B01D 53/52 (2006.01)
- B01D 53/62 (2006.01)
- B01D 53/80 (2006.01)
- B01D 53/81 (2006.01)
- B01D 53/96 (2006.01)
- C10L 3/06 (2006.01)
- C10L 3/10 (2006.01)
- B01J 31/16 (2006.01)
- B01J 20/22 (2006.01)
- B01J 20/28 (2006.01)
- B01D 53/04 (2006.01)

(52) U.S. Cl.
CPC ... *B01J 20/28057* (2013.01); *B01J 20/28069* (2013.01); *C10L 3/103* (2013.01); *B01D 2253/204* (2013.01); *B01D 2256/245* (2013.01); *B01D 2257/304* (2013.01); *B01D 2257/504* (2013.01); *B01D 2257/7022* (2013.01); *B01D 2258/05* (2013.01); *C10L 2290/542* (2013.01); *Y02C 10/08* (2013.01)

(56) References Cited

OTHER PUBLICATIONS

Babarao, et al., "Molecular simulations for adsorptive separation of CO2/CH4 Mixture in metal-exposed, catenated, and charged metal-Organic Frameworks", Langmuir Article, 2009, 5239-5247.
Belmabkhout, et al., "Simultaneous Adsorption of H2S and CO2 on Triamine-Grafted Pore-Expanded Mesoporous MCM-41 Silica", Energy Fuels 2011, 25, 1310-1315.
Liu, et al., "Assembly of metal-organic frameworks (MOFs) based on indium-timer building blocks: A porous MOF with soc Topology and High hydrogen storage", Angew.Chem. Int., Ed., 2007, 3278-3283.
Moellmer et al., "Insights Adsorption Characterization of Metal-Organic Frameworks: A benchmark Study on the Novel soc-MOF", Microporous and Mesoporous Materials, 2010, 345-353.
Mowat, et al., "Synthesis, characterisation and adsorption properties of microporous scandium carboxylates with ridig and flexible frameworks", Microporous and Mesoporous Materials, 2011, 322-333.
Pang, et al., "Highly monodisper M'-based soc-MOFs(M=In and Ga) with cubic and truncated cubic morphologies", Journal of the American Chemical Society, 2012, 13176-13179.
Peng, et al., "Computational screening of porous carbons, zeolites, and metal organic frameworks for desulfurization and decarburization of biogas, natural gas, and flue gas", AIChE Journal, Aug. 2013, 2928-2942.
Christophe, et al., "Synthesis, Single-Crystal X-ray Microdiffraction, and NMR Characterizations of the Giant Pore Metal-Organic Framework Aluminum Trimesate MIL-100", Chemistry of Materials Communication, American Chemical Society, 2009, 5695-5697.
Felipe, et al., "High Methane Storage Capacity in Aluminum Metal-Organic Frameworks", Journal of The American Chemical Society, 2014, 5271-5274.
Hiroyasu, et al., "Ultrahigh Porosity in Metal-Organic Frameworks", Science, vol. 329, Jul. 23, 2010, 424-429.
Mohamed, et al., "Zeolite-like metal-organic frameworks (ZMOFs): design, synthesis, and properties", Chem Soc Rev, Royal Society of Chemistry, 2015, 228-249.
Morris, et al., "Gas Storage in Nanoporous Materials", Gas Storage Materials, Angewandte Chemie Int. Ed., 2008, 4966-4981.
Mueller, et al., "Metal-organic frameworks—prospective industrial applications", Journal of Materials Chemistry, 2006, 626-636.
Thomas, et al., "High valence 3p and transition metal based MOFs", Chem Soc Rev, Royal Society of Chemistry, 2014, 6097-6115.
Vincent, et al., "A Supermolecular building approach for the design and construction of metal-organic frameworks", Chem Soc Rev, Royal Society of Chemistry, 2014, 6141-6172.
Yabing, et al., "Methane storage in metal-organic frameworks", Chem Soc Rev, Royal Society of Chemistry, 2014, 5657-5678.
Yu, et al., "High Pressure Excess Isotherms for Adsorption of Oxygen and Nitrogen in Zeolites", Langmuir, 2011, 10648-10656.
Allen, "The Cambridge Structural Database: A Quarter of a Million Crystal Structures and Rising", Acta Crystallographica Section B Structural Science, vol. 58, 2002, pp. 380-388.
Bae, "Carborane-based metal-organic frameworks as highly selective sorbents for CO2 over methane", Chem. Commun., 2008, 4135-4137.
Barthelet, et al., "[VIII(H2O)]3O(O2CC6H4CO2)3-(Cl, 9H2O) (MIL-59):Rare Example of Vanadocarboxylate With a Magnetically Frustrated Three-Dimensional Hybrid Framework", Chemical Communications, Jun. 11, 2002, pp. 1492-1493.
Bloch, et al., "Hydrocarbon Separations in a Metal-Organic Framework with Open Iron(II) Coordination Sites", Mar. 30, 2012, vol. 335, 1606-1610.
Bourrelly, et al., "Different Adsorption Behaviors of Methane and Carbon Dioxide in the Isotypic Nanoporous Metal Terephthalates MIL-53 and MIL-47", J. Am. Chem. Soc. Sep. 13, 2005, 127, 13519-13521.
Brant, et al., "Single-Metal-Ion-Based Molecular Building Blocks (MBBs) Approach to the Design and Synthesis of Metal-Organic Assemblies", Journal of Molecular Structure, vol. 796, 2006, pp. 160-164.
Brown, et al., "Quantum Rotation of Hydrogen in Single-Wall Carbon Nanotubes", Chemical Physics Letters, vol. 329, 2000, pp. 311-316.
Cote, et al., "Porous, Crystalline, Covalent Organic Frameworks", Science, vol. 310, Nov. 18, 2005, pp. 1166-1170.
Dybtsev, et al., "Rigid and Flexible: A Highly Porous Metal-Organic Framework with Unusual Guest-Dependent Dynamic Behavior", Angewandte Chemie International Edition, vol. 43, 2004, pp. 5033-5036.
Eddaoudi, et al., "Geometric Requirements and Examples of Important Structures in the Assembly of Square Building Blocks", PNAS, vol. 99, No. 8, Apr. 16, 2002, pp. 4900-4904.
Eddaoudi, et al., "Modular Chemistry: Secondary Building Units as a Basis for the Design of Highly Porous and Robust Metal-Organic Carboxylate Frameworks", Accounts of Chemical Research,. vol. 34, No. 4, Feb. 17, 2001, pp. 319-330.
Eddaoudi, et al., "Systematic Design of Pore Size and Functionality in Isoreticular MOFs and Their Application in Methane Storage", Science, vol. 295, Jan. 18, 2002, 469-472.
Evans, et al., "Crystal Engineering of NLO Materials Based on Metal—Organic Coordination Networks", Accounts of Chemical Research, vol. 35, No. 7, Apr. 20, 2002, pp. 511-522.
Ferey, et al., "A Chromium Terephthalate-Based Solid with Unusually Large Pore Volumes and Surface Area", Science, vol. 309, Sep. 23, 2005, pp. 2040-2042.
Ferey, et al., "A Hybrid Solid with Giant Pores Prepared by a Combination of Targeted Chemistry, Simulation, and Powder Diffraction", Angewandte Chemie International Edition, vol. 43, 2004, pp. 6296-6301.
Ferey, et al., "Crystallized Frameworks with Giant Pores: Are There Limits to the Possible?", Accounts of Chemical Research, vol. 38, No. 4, Jan. 19, 2005, pp. 217-225.
Ferey, et al., "Hydrogen Adsorption in the Nanoporous Metal-Benzenedicarboxylate M(OH)(O2C-C6H4-CO2) (M=Al3+, Cr3+), MIL-53", Chemical Communications, vol. 24, Nov. 4, 2003, pp. 2976-2977.
Forster, et al., "Hydrogen Adsorption in Nanoporous Nickel(II) Phosphates", Journal of the American Chemical Society, vol. 125, Jan. 10, 2003, pp. 1309-1312.
Fujita, et al., "Coordination Assemblies from a Pd(II)-Cornered Square Complex", Accounts of Chemical Research, vol. 38, No. 4, Feb. 15, 2005, pp. 371-380.
Hamon, et al., "Comparative Study of Hydrogen Sulfide Adsorption in the MIL-53(Al, Cr, Fe), MIL-47(V), MIL-100(Cr), and MIL-

(56) References Cited

OTHER PUBLICATIONS

101(Cr) Metal-Organic Frameworks at Room Temperature", J. Am. Chem. Soc. 2009, 131, 8775-8777.
Hirsch, et al., "Spherical Aromaticity of Inorganic Cage Molecules", Angewandte Chemie International Edition, vol. 40, No. 15, 2001, pp. 2834-2838.
Kahn, "Chemistry and Physics of Supramolecular Magnetic Materials", Accounts of Chemical Research, vol. 33, No. 10, Oct. 2000, pp. 647-657.
Kaye, et al., "Hydrogen Storage in the Dehydrated Prussian Blue Analogues M3[Co(CN)6]2 (M=Mn, Fe, Co, Ni, Cu, Zn)", Journal of the American Chemical Society, vol. 127, Apr. 15, 2005, pp. 6506-6507.
Kitagawa, et al., "Functional Porous Coordination Polymers", Angewandte Chemie International Edition, vol. 43, 2004, pp. 2334-2375.
Leclerc, et al., "Infrared study of the influence of reducible iron(III) metal sites on the adsorption of CO, CO2, propane, propene and propyne in the mesoporous metal—organic framework MIL-100w", Phys. Chem. Chem. Phys., 2011, 13, 11748-11756.
Lee, et al., "A Comparison of the H2 Sorption Capacities of Isostructural Metal-Organic Frameworks With and Without Accessible Metal Sites: [{Zn2(abtc)(dmf)2}3] and [{Cu2(abtc)(dmf)2}3] versus [{Cu2(abtc)}3]", Angew. Chem. Int. Ed. 2008, 47, 7741-7745.
Lee, et al. "Achieving High Density of Adsorbed Hydrogen in Microporous Metal Organic Frameworks", Advanced Materials, vol. 17, 2005, pp. 2703-2706.
Lee, et al. "Gas Sorption Properties of Microporous Metal Organic Frameworks", Journal of Solid State Chemistry, vol. 178, 2005, pp. 2527-2532.
Li, et al., "Coordinatively Unsaturated Metal Centers in the Extended Porous Framework of Zn3(Bdc)3.6CH3OH (BDC = 1,4-Benzenedicarboxylate)", Journal of the American Chemical Society, vol. 120, No. 9, Feb. 20, 1998, pp. 2186-2187.
Li, et al. "Design and Synthesis of an Exceptionally Stable and Highly Porous Metal-Organic Framework", Nature, vol. 402, Nov. 18, 1999, pp. 276-279.
Li, et al. "Selective gas adsorption and separation in metal-organic frameworks", Chem. Soc. Rev., 2009, 38, 1477-1504.
Liu, et al., "4-Connected Metal-Organic Assemblies Mediated via Heterochelation and Bridging of Single Metal Ions: Kagome Lattice and the M6L12 Octahedron", Journal of the American Chemical Society, vol. 127, Apr. 27, 2005, pp. 7266-7267.
Liu, et al. "Molecular Building Blocks Approach to the Assembly of Zeolite-Like Metal-Organic Frameworks (ZMOFs) With Extra-Large Cavities", Chemical Communications, Feb. 2, 2006, pp. 1488-1490.
MacGillivray, et al., "A Chiral Sphericalmolecular Assembly Held Together by 60 Hydrogen Bonds", Nature, vol. 389, Oct. 2, 1997, pp. 469-472.
Matsuda, et al., "Highly controlled acetylene accommodation in a metal—organic microporous material", Nature, vol. 436, Jul. 14, 2005, 238-241.
Mendes, et al., "Separation of Hexane Isomers on Rigid Porous Metal Carboxylate-Based Metal—Organic Frameworks", Adsorption Science & Technology vol. 32 No. 6 2014, 475-488.
Moon, et al., "Redox-Active Porous Metal-Organic Framework Producing Silver Nanoparticles from AgI Ions at Room Temperature", Angewandte Chemie International Edition, vol. 44, 2005, pp. 1261-1265.
Moulton, et al., "Crystal Engineering of a Nanoscale Kagome Lattice", Angewandte Chemie, vol. 114, No. 15, 2002, pp. 2945-2948.
Moulton, et al., "From Molecules to Crystal Engineering: Supramolecular Isomerism and Polymorphism in Network Solids", Chemical Reviews, vol. 101, No. 6, May 12, 2001, pp. 1629-1658.
Nicol, et al., "Dynamics of Molecular Hydrogen Adsorbed in CoNa-A Zeolite", Journal of Physical Chemistry, vol. 92, 1988, pp. 7117-7121.
Noro, et al., "A new, Methane Adsorbent, Porous Coordination Polymer [{CuSiF6(4,4'-bipyridine)2}]", Angew. Chem. Int. Ed. 2000, 39, No. 12 2081-2084.
O'Keeffe, et al., "Frameworks for Extended Solids: Geometrical Design Principles", Journal of Solid State Chemistry, vol. 152, 2000, pp. 3-20.
Ren, et al., "Neutron Scattering Study of H2 Adsorption in Single-Walled Carbon Nanotubes", Applied Physics Letters, vol. 79, No. 22, Nov. 26, 2001, pp. 3684-3686.
Rosi, et al., "Hydrogen Storage in Microporous Metal-Organic Frameworks", Science, vol. 300, May 16, 2003, pp. 1127-1129.
Rowsell, et al., "Characterization of H2 Binding Sites in Prototypical Metal—Organic Frameworks by Inelastic Neutro Scattering", Journal of the American Chemical Society, vol. 127, 2005, pp. 14904-14910.
Safarik, et al., "Olefin/Paraffin Separations by Reactive Absorption: A Review", Ind. Eng. Chem. Res. 1998, 37, 2571-2581.
Seidel, et al., "High-Symmetry Coordination Cages via Self-Assembly", Accounts of Chemical Research, vol. 35, No. 11, Aug. 21, 2002, pp. 972-983.
Seo, et al., "A Homochiral Metal-Organic Porous Material for Enantioselective Separation and Catalysis", Nature, vol. 404, Apr. 27, 2000, pp. 982-986.
Silvera, "The Solid Molecular Hydrogens in the Condensed Phase: Fundamentals and Static Properties", Reviews of Modern Physics, vol. 52, No. 2, Part I, Apr. 1980, pp. 393-452.
Sudik, et al., "Metal-Organic Frameworks Based on Trigonal Prismatic Building Blocks and the New "acs" Topology", Inorganic Chemistry, vol. 44, No. 9, Mar. 31, 2005, pp. 2998-3000.
Volkringer, et al., "A New Indium Metal-Organic 3D Framework With 1,3,5-Benzenetricarboxylate, MIL-96 (In), Containing u3-Oxo-Centered Trinuclear Units and a Hexagonal 18-Ring Network", Materials Research Bulletin, vol. 41, 2006, pp. 948-954.
Wang, et al., "Design, Synthesis, and Photochemical Behavior of Poly(benzyl ester) Dendrimers with Azobenzene Groups throughout Their Architecture", Journal of Organic Chemistry, vol. 69, No. 26, Dec. 1, 2004, pp. 9073-9084.
Wu, et al., "A Homochiral Porous Metal-Organic Framework for Highly Enantioselective Heterogeneous Asymmetric Catalysis", Journal of the American Chemical Society, vol. 127, No. 25, Jun. 4, 2005, pp. 8940-8941.
Xiang, et al., "Rationally tuned micropores within enantiopure metal-organic frameworks for highly selective separation of acetylene and ethylene", nature communications, Feb. 22, 2011, 7 pages.
Yaghi, et al., "Construction of a New Open-Framework Solid From 1,3,5-Cyclohexanetricarboxylate and Zinc(II) Building Blocks", Journal of the Chemical Society, Dalton Transactions, Jan. 1, 1997, pp. 2383-2384.
Yaghi, et al., "Reticular Synthesis and the Design of New Materials", Nature, vol. 423, Jun. 12, 2003, pp. 705-714.
Yaghi, et al., "Selective Guest Binding by Tailored Channels in a 3-D Porous Zinc(II)-Benzenetricarboxylate Network", Journal of the American Chemical Society, vol. 119, No. 12, 1997, pp. 2861-2868.
Yang, et al., "Zinc Phosphate with Gigantic Pores of 24 Tetrahedra", Journal of the American Chemical Society, vol. 121, Aug. 31, 1999, pp. 8389-8390.
Yoon, et al., "Controlled Reducibility of a Metal-Organic Framework with Coordinatively Unsaturated Sites for Preferential Gas Sorption", Angew. Chem. Int. Ed. 2010, 49, 5949-5952.
Zhang, et al., "Microporous metal-organic frameworks for acetylene storage and separation", CrystEngComm, 2011, 13, 5983.
Zhao, et al. "Hysteretic Adsorption and Desorption of Hydrogen by Nanoporous Metal-Organic Frameworks", Science, vol. 306, Nov. 5, 2004, pp. 1012-1015.

METAL ORGANIC FRAMEWORKS FOR REMOVAL OF COMPOUNDS FROM A FLUID

CROSS REFERENCE TO RELATED APPLICATIONS

This application claims benefit of U.S. Provisional Application No. 62/041,516, filed on 25 Aug. 2014 and which application is incorporated herein by reference. A claim of priority is made.

BACKGROUND

As society continues to deplete fossil fuel reserves, alternate energy solutions are constantly sought after to supplant fossil fuel sources, such as biogas and natural gas with cleaner and more abundant energy sources. Although natural gas is a fossil fuel, it is acknowledged as an excellent alternative before a transition to cleaner energy solutions. However, natural gas often contains significant amounts of $CO_2$ and $H_2S$ that have to be removed or reduced to less than 1% for $CO_2$ and 4 ppm for $H_2S$ to meet the specifications for pipeline transportation. Particularly, wells in Saudi Arabia and Russia can contain up to 20% $H_2S$.

Biogas generally consists of methane (approx. 65% in volume), carbon dioxide (approx. 35% in volume) and traces of hydrogen sulfide (<2%) and ammonia (<1%). The high content of carbon dioxide and the presence of hydrogen sulfide and ammonia make it unsuitable to be used in place of natural gas in gas distribution networks. Absence of hydrogen sulfide is a must to avoid corrosion in compressors, gas storage tanks, pipes and engines.

Current technologies for natural gas upgrading (e.g., removing one or more of $H_2S$, $CO_2$, and condensable hydrocarbons) are often multi-stage processes, thus costly. In order to reduce costs and efficiency, industry desires selective adsorbents for the removal of $CO_2$, $H_2S$ and condensable hydrocarbons which exhibit high structure stability over multiple sorption cycles.

SUMMARY

In general, embodiments of the present invention provide a method of removing compounds from a fluid. The method includes contacting one or more metal organic framework (MOF) compositions with one or more fluids, such as natural gas and biogas, and sorbing one or more compounds, such as of $CO_2$, $H_2S$ and condensable hydrocarbons. In some embodiments, the one or more of $CO_2$, $H_2S$ and/or condensable hydrocarbons can be sorbed simultaneously or in series.

In some embodiments, the MOF is an M-soc-MOF, wherein M is a trivalent metal. The trivalent metal can comprise gallium, indium, iron, scandium, or aluminum, in some embodiments. The M-soc-MOF can comprise a plurality of 6-connected timer molecular building blocks (TMBBs) networked by tetradentate organic ligands, wherein each of the TMBBs can comprise three metal carboxylate octahedra.

In some embodiments, the tetradentate organic ligands are rectangular planar. In some embodiments, the tetradentate organic ligands comprise tetracarboxylate ligands. In some embodiments, the tetradentate organic ligands comprise amidetetracarboxylate or 3,3',5,5'-azobenzenetetracarboxylate.

The details of one or more examples are set forth in the accompanying drawings and the description below. Other features, objects, and advantages will be apparent from the description and drawings, and from the claims.

DETAILED DESCRIPTION

Figure 1:
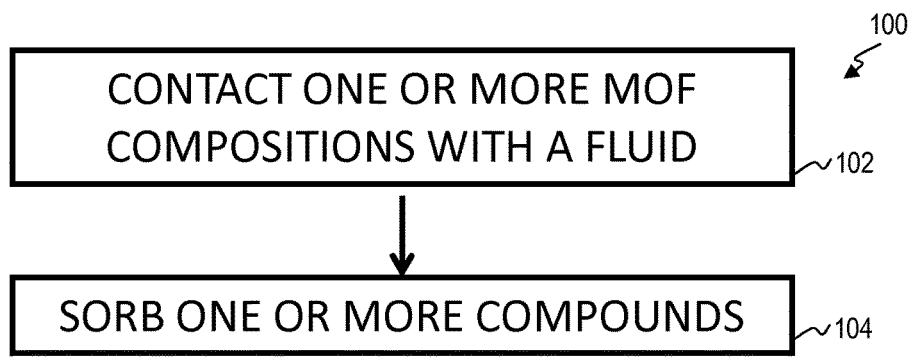
FIG. 1 illustrates a block flow diagram of a method of removing one or more compounds from a fluid, according to an embodiment.

Embodiments of the present invention provide the use of stable MOFs and MOF compositions, particularly M-soc-MOFs, for the subsequent (i.e., in series) or simultaneous removal of $CO_2$, $H_2S$, and condensable hydrocarbons. Embodiments as described have the potential to reduce the number of processes in the natural gas or biogas overall treatment scheme. It is expected that the regeneration of M-soc-MOF compositions will be cost effective in comparison to conventional amine scrubbing. M-soc-MOF compositions also exhibit high affinity for condensable hydrocarbons ($C_2H_6$, $C_3H_8$, . . . ) at the inverse of zeolites and activated carbons.

Metal organic frameworks (MOFs) are a versatile and promising class of crystalline solid state materials which allow porosity and functionality to be tailored towards various applications. For example, MOF materials exhibit exceptionally high specific surface area, in addition to tunable pore size and functionality (e.g., $CO_2$ and $H_2S$ selectivity), which make them suitable for many applications including gas storage, gas separation, catalysis, drug delivery, light-emitting devices, and sensing.

Generally, MOFs comprise a network of nodes and ligands, wherein a node has a connectivity capability at two or more functional sites, and a ligand has a connectivity capability at two functional sites each of which connect to a node. Nodes are typically metal ions or metal containing clusters, and, in some instances, ligands with node connectivity capability at two or more functional sites can also be characterized as nodes. In some instances, ligands can include two functional sites capable of each connecting to a node, and optionally one or more additional functional sites which do not connect to nodes within a particular framework. In some embodiments, ligands can be poly-functional, or polytopic, and comprise two or more functional sites capable of each connecting to a node. In some embodiments, polytopic ligands can be heteropolytopic, wherein at least two of the two or more functional sites are different.

A MOF can comprise a metal-based node and an organic ligand which extrapolate to form a coordination network. Such coordination networks have advantageous crystalline and porous characteristics affecting structural integrity and interaction with foreign species (e.g., gases). The particular combination of nodes and ligands within a framework will dictate the framework topology and functionality.

Through ligand modification or functionalization, the environment in the internal pores can be modified to suit specific applications.

MOF can be represented by the formula $[(\text{node})_a(\text{ligand})_b(\text{solvent})_c]_n$, wherein n represents the number of molecular building blocks. Solvent represents a guest molecule occupying pores within the MOF, for example as a result of MOF synthesis, and can be evacuated after synthesis to provide a MOF with unoccupied pores. Accordingly, the value of c can vary down to zero, without changing the definitional framework of the MOF. Therefore, in many instances, MOFs can be defined as [(node)a(ligand)b]n, without reference to a solvent or guest molecule component.

FIG. 1 illustrates a block flow diagram of a method 100 of removing one or more compounds from one a fluid, according to an embodiment. Method 100 includes contacting 102 one or more metal organic framework (MOF) compositions with a fluid and sorbing 104 one or more compounds from the fluid with the one or more MOF compositions. In particular, method 100 includes contacting 102 one or more M-soc-MOF compositions with a fluid and sorbing 104 one or more compounds from the fluid with the one or more M-soc-MOF compositions. Contacting 102 can include mixing, bringing in close proximity, chemically contacting, physically contacting or combinations thereof. Fluids can include general liquids and gases. In some embodiments, fluids include industrial process fluids. Examples of specific fluids include one or more of natural gas and biogas. Fluids can further comprise water, including water in a liquid form, a gaseous form, or combinations thereof.

In one embodiment, sorbing 104 comprises absorbing. In one embodiment, sorbing 104 comprises adsorbing. In one embodiment, sorbing 104 comprises a combination of adsorbing and absorbing. Sorbing 104 can include selective sorption (i.e., sorption of a single compound), or simultaneous sorption (e.g., sorption of a plurality of compounds). The M-soc-MOF compositions can sorb about 1% to about 99.9%, about 1% to about 90%, about 1% to about 50% or about 1% to about 30% of one or more compounds in a fluid. Sorbing 104 can occur at ambient temperature, at an elevated temperature, at a cooled temperature, or over a temperature range. In one embodiment, a temperature can be selectively changed to manipulate sorption and/or desorption of different compounds. Sorbing 104 can occur at ambient pressure, at an elevated pressure, at a cooled pressure, or over a pressure range. In one embodiment, pressure can be selectively changed to manipulate sorption and/or desorption of different compounds. In addition to or in the alternative to, a concentration of one or more M-soc-MOF compositions can be varied to affect a rate and/or magnitude of sorbing 104. One or more of temperature, pressure and M-soc-MOF concentration can be regulated to produce a simultaneous sorption of compounds, or a subsequent, step-wise sorption (i.e., in series) of compounds from a fluid. In series sorption generally includes sorbing a quantity of a first compound via a MOF, and subsequently sorbing a quantity of a second compound via the same MOF while at least a portion of the quantity of the first compound remains sorbed. Simultaneous sorption generally includes contacting a plurality of compounds with an MOF, and sorbing a quantity of each of the two compounds with the MOF.

One compound which can be sorbed by an M-soc-MOF from a fluid is $CO_2$. $CO_2$ can be sorbed from a fluid comprising $H_2O$ and/or $CH_4$ by an M-soc-MOF with selectivity over one or more of $H_2O$ and $CH_4$. One compound which can be sorbed by an M-soc-MOF from a fluid is $H_2S$. $H_2S$ can be sorbed from a fluid comprising $H_2O$ and/or $CH_4$ by an M-soc-MOF with selectivity over one or more of $H_2O$ and $CH_4$. $CO_2$ and $H_2S$ can be simultaneously sorbed from a fluid comprising $H_2O$ and/or $CH_4$ by an M-soc-MOF with selectivity over one or more of $H_2O$ and $CH_4$. $CO_2$ and $H_2S$ can be sorbed from a fluid comprising $H_2O$ and/or $CH_4$ in series by an M-soc-MOF with selectivity over one or more of $H_2O$ and $CH_4$. In a specific embodiment, $CO_2$ and $H_2S$ can be simultaneously sorbed from natural gas and/or biogas by an M-soc-MOF with selectivity over other one or more of $H_2O$ and $CH_4$. In a specific embodiment, $CO_2$ and $H_2S$ can be sorbed from a fluid comprising $H_2O$ and/or $CH_4$ in series by an M-soc-MOF with selectivity over other one or more of $H_2O$ and $CH_4$. Generally, the above sorption abilities and stability in the presence of water of suitable M-soc-MOFs as disclosed herein is an advantageous aspect unavailable from other M-soc-MOFs and industrial materials such as zeolites and activated carbon.

Condensable hydrocarbons can be sorbed by an M-soc-MOF from a fluid. Examples of condensable hydrocarbons include ethane, propane, butane, pentane, and hexane. In some embodiments, examples of condensable hydrocarbons include straight chained alkanes with 6 carbons or less. Condensable hydrocarbons and one or more of $CO_2$ and $H_2S$ can be simultaneously sorbed from a fluid, with selectivity over other one or more of $H_2O$ and $CH_4$. Condensable hydrocarbons and one or more of $CO_2$ and $H_2S$ can be sorbed in series from a fluid, with selectivity over other one or more of $H_2O$ and $CH_4$. The ability to sorb condensable hydrocarbons is one advantageous aspect of suitable M-soc-MOFs as disclosed herein over other materials such as zeolites and activated carbon.

Figure 2A:
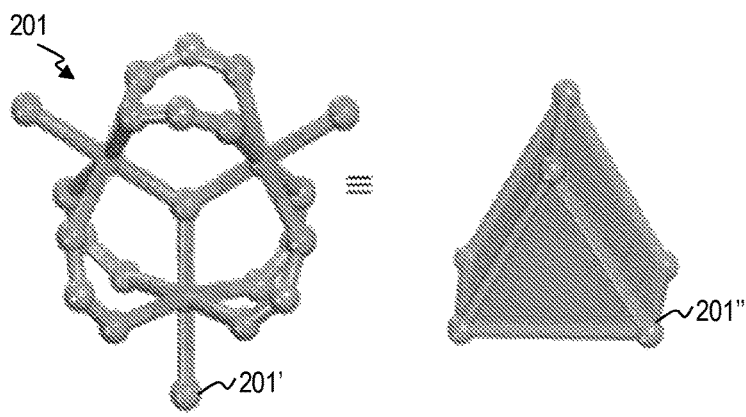
FIG. 2A illustrates a ball-and-stick structure and a polyhedral representation of a trimer molecular building block, according to one or more embodiments.
Figure 2B:
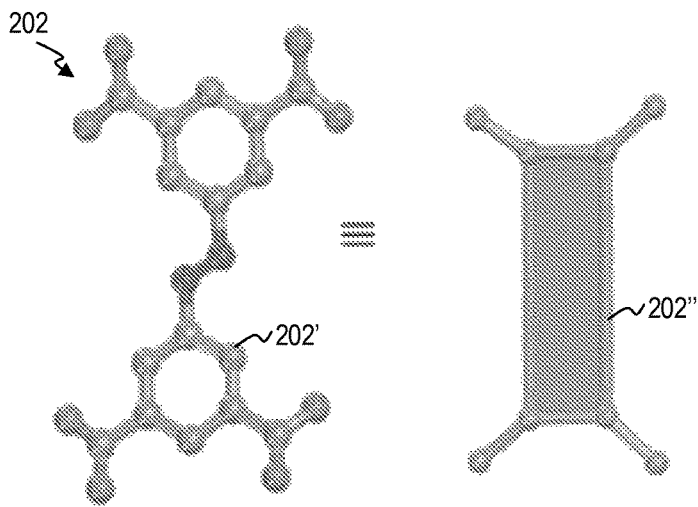
FIG. 2B illustrates a ball-and-stick structure and a polyhedral representation of a suitable organic ligand, according to one or more embodiments.

M-soc-MOFs suitable for method 100 include M-soc-MOFs 200 comprising one or more trimer molecular building blocks (TMBB) 201, as shown in FIG. 2A, and one or more organic ligands 202, as shown in FIG. 2B. FIG. 2A illustrates a ball-and-stick structure 201' and a polyhedral representation 201" of a TMBB 201. FIG. 2B illustrates a ball-and-stick structure 202' and a polyhedral representation 202" of one example of a suitable organic ligand 202. A TMBB 201 comprises three metal carboxylate octahedra, each octahedral generally described as [$MO_5(H_2O)$], wherein M=a metal. A TMBB 201 can be generally described as $M_3O_x(CO_2)_y$. One example of a TMBB 201 can be described as [$Ga_3O(CO_2)_6(H_2O)_3$]. One example of a TMBB 201 can be described as [$In_3O(CO_2)_6$]. One example of a TMBB 201 can be described as [$Al_3O(CO_2)_6$]. The three metal octahedra are metal-centered, and all share one central $\mu_3$-oxo anion. In each octahedron, the apical position can be occupied by a terminal water molecule. The metal-carboxylate clusters generate a rigid node with fixed geometry involving multiple metal-oxygen coordination bonds which induce the stability of the node and subsequently enhance the thermal stability and overall rigidity of the framework.

Suitable metals (M) include trivalent metals (i.e., metals capable of exhibiting a +3 oxidation state). Trivalent metals include aluminum, scandium, titanium, vanadium, chromium, manganese, iron, cobalt, nickel, copper, gallium, germanium, arsenic, yittrium, zirconium, niobium, molybdenum, palladium, silver, indium, tin, antimony, lanthanum, cerium, praseodymium, samarium, europium gadolinium, terbium, erbium, thulium, ytterbium, lutetium, tantalum, tungsten, rhenium, osmium, iridium, platinum, gold, lead, and bismuth. Particularly suitable trivalent metals include gallium, indium, iron, scandium, and aluminum. The three trivalent metals yield an overall cationic framework (+1 per formula unit) that is balanced by $[NO_3]^{-1}$ ions. The disordered $[NO_3]^{-1}$ ions occupy statistically two positions on the threefold axis with equal probability. A broad range of suitable trivalent metals advantageously allows for M-soc-MOFs to be customized for particular purposes. For example, lighter trivalent metals can provide an M-soc-MOF with increased sorption uptake per unit volume.

Figure 2C:
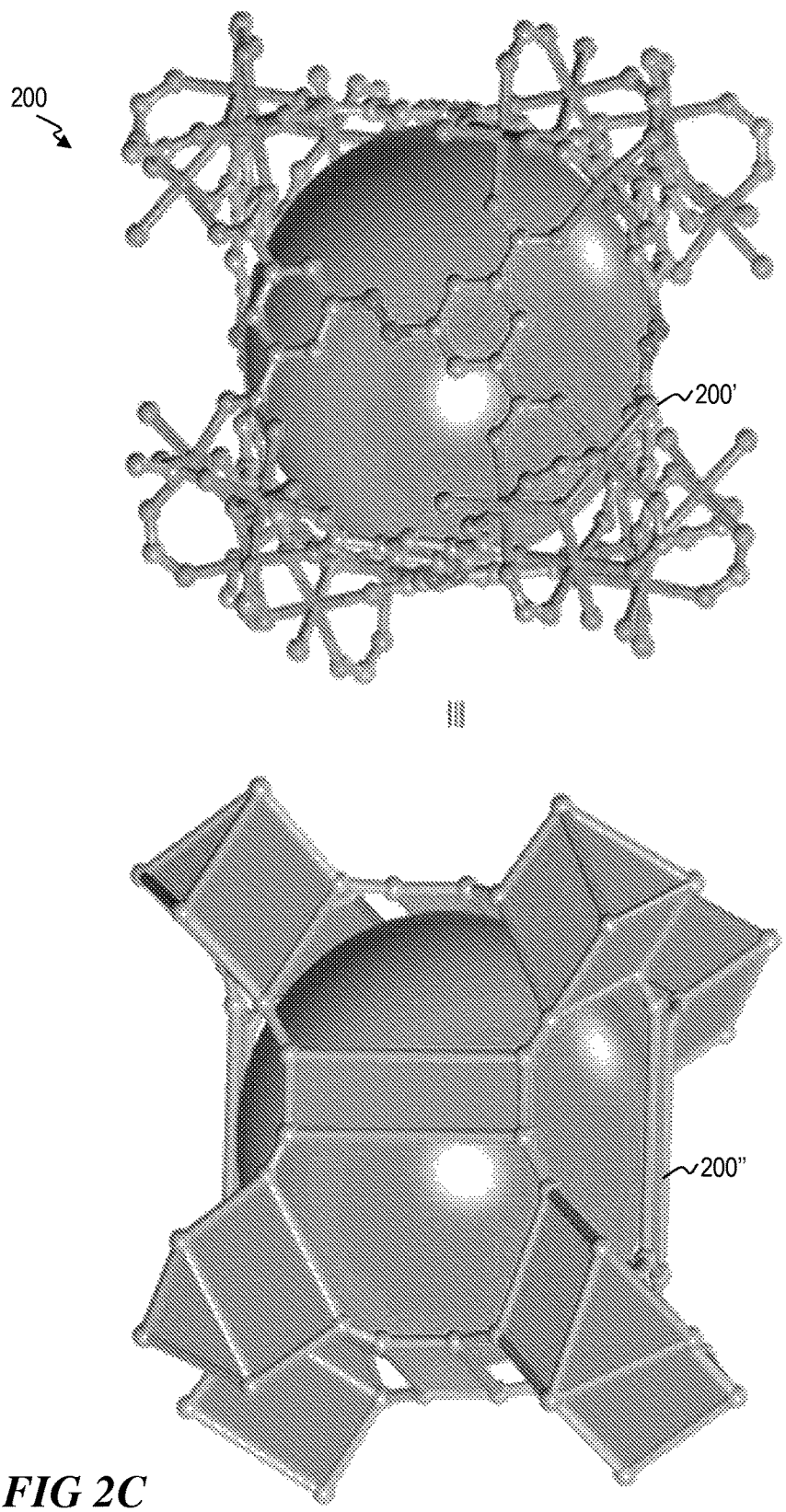
FIG. 2C illustrates a ball-and-stick structure and a polyhedral representation of a M-soc-MOF, according to one or more embodiments.

Each TMBB unit is linked by six separate organic ligands 202, as shown in FIG. 2A, to produce a novel 3D structure 200 having an soc-topology, as shown in FIG. 2C. Suitable ligands are tetradentate. Suitable tetradentate ligands include rectangular planar ligands. A generally suitable ligand is a tetracarboxylate ligand. One particular suitable ligand is amidetetracarboxylate:

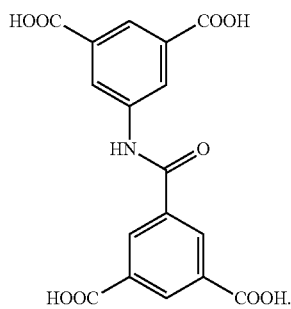 [SMILES: O=C(O)c1cc(NC(=O)c2cc(C(=O)O)cc(C(=O)O)c2)cc(C(=O)O)c1]

One particular suitable ligand is 3,3',5,5'-azobenzenetetracarboxylate:

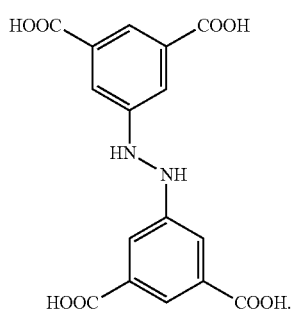 [SMILES: O=C(O)c1cc(NNc2cc(C(=O)O)cc(C(=O)O)c2)cc(C(=O)O)c1]

FIG. 2C illustrates a ball-and-stick structure 200' and a polyhedral representation 200" of a suitable M-soc-MOF 200 comprised of a plurality of 6-connected TMBBs 201 networked by organic tetradentate planar ligands 202. In FIG. 3C, hydrogen atoms, water molecules, and $[NO_3]$-ions are omitted for clarity. One example M-soc-MOF 200 can be described as $[In_3O(C_{16}N_2O_8H_6)_{1.5}(H_2O)_3](H_2O)_3(NO_3)$. All such M-soc-MOFs are characterized by an soc-topology, and can generally be denoted as M-soc-MOFs. The soc-topology of M-soc-MOF 200 provides unique structure features, including the presence of isolated nanometer-scale carcerand-like capsules, which anchor nitrate ions, and which are strictly accessible through the two main channels by very restricted windows. Such characteristics provide high, localized charge density advantageous for chemical and physical sorption of compounds.

Other interesting structural features of the crystalline structure are its two types of infinite channels. The first type is hydrophilic, due to the water molecules coordinated to the indium centers which are pointed inside these channels. Guest water molecules occupy the remaining free volume in these channels and form hydrogen bonds with coordinated water molecules. The second type of channels can be guest free, and have an approximately 1 nm diameter.

M-soc-MOFs can have a BET surface area of at least about 800 $m^2/g$, at least about 900 $m^2/g$, at least about 1,000 $m^2/g$, at least about 1,200 $m^2/g$, at least about 1,400 $m^2/g$, or at least about 1,600 $m^2/g$. In a specific embodiment, an M-soc-MOF has a BET surface area of at least about 800 $m^2/g$. In a specific embodiment, an M-soc-MOF has a BET surface area of about 1,000 $m^2/g$. In a specific embodiment, an M-soc-MOF has a BET surface area of about 1,000 $m^2/g$ to about 1,600 $m^2/g$.

M-soc-MOFs can have an average pore volume of at least about 0.2 $cm^3/g$, at least about 0.25 $cm^3/g$, at least about 0.3 $cm^3/g$, at least about 0.45 $cm^3/g$, at least about 0.6 $cm^3/g$, or at least about 0.65 $cm^3/g$. In a specific embodiment, an M-soc-MOF has an average pore volume of at least about 0.2 $cm^3/g$. In a specific embodiment, an M-soc-MOF has an average pore volume of about 0.3 $cm^3/g$. In a specific embodiment, an M-soc-MOF has an average pore volume of about 0.3 $cm^3/g$ to about 0.65 $cm^3/g$.

EXAMPLE 1

Synthesis of Indium-soc-MOF

Figure 3:
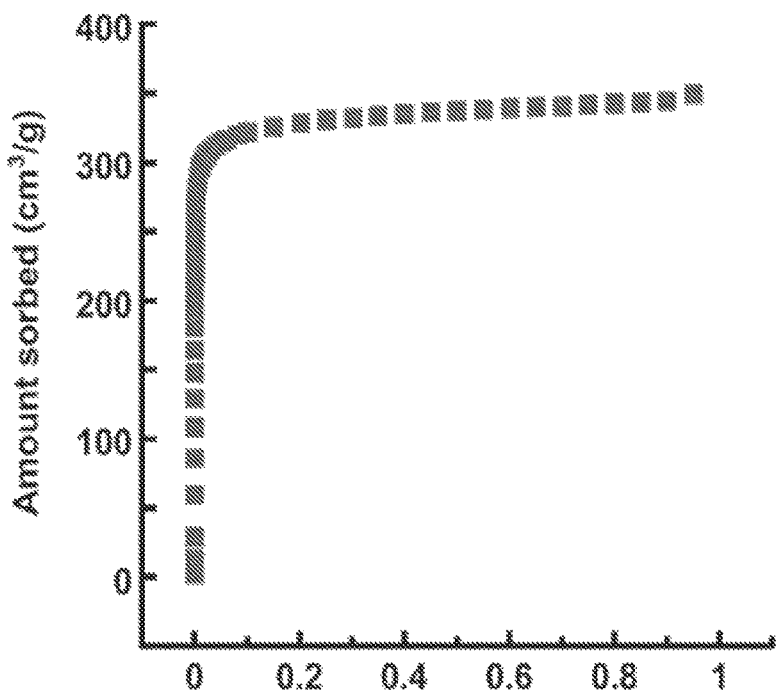
FIG. 3 illustrates the results of a $N_2$ adsorption/desorption study for a M-soc-MOF, according to one or more embodiments.

In this example, an In-soc-MOF formulated as $[In_3O(C_{16}N_2O_8H_6)_{1.5}(H_2O)_3](H_2O)_3(NO_3)$ was synthesized by reacting 3,3',5,5'-azobenzenetetracarboxylic acid and $In(NO_3)_3 \cdot 2H_2O$ in a N,N-dimethylformamide (DMF)/$CH_3CN$ solution in the presence of piperazine. The resulting In-soc-MOF consisted of orange polyhedral crystals. It's structure included indium trimer building blocks, each trimer containing three $\{InO_5(H_2O)\}$ octahedra sharing one central m3-oxo anions, and networked by six separate 3,3',5,5'-azobenzenetetracarboxylate ligands. The total solvent-accessible volume for the In-soc-MOF was determined to be 57.2% by summing voxels more than 1.2 Å away from the framework using PLATON software. FIG. 3 illustrates the results of a $N_2$ adsorption/desorption study, which revealed a reversible type I isotherm with no hysteresis. Such results are characteristic of a microporous material with homogeneous pores. The estimated Langmuir surface area and pore volume for In-soc-MOF are 1417 $m2\ g^{-1}$ and 0.50 $cm3\ g^{-1}$, respectively.

Other interesting structural features of the crystalline In-soc-MOF structure are the two types of infinite channels. The first type is hydrophilic, because the water molecules coordinated to the indium centers are pointed inside these channels. Guest water molecules occupy the remaining free volume in these channels and form hydrogen bonds with coordinated water molecules. The second type of channels have a diameter of approximately 1 nm diameter, and are guest-free as-synthesized.

The synthesis methods of this study are generally applicable to similar M-soc-MOFs, including those with lighter trivalent metals.

EXAMPLE 2

CO$_2$ and H$_2$ Sorption by Gallium-soc-MOF

This example utilizes use of metal organic frameworks as sorbents for use in simultaneous or subsequent removal of CO$_2$ and H$_2$S. The Ga-soc-MOF in question is constructed based on the assembly of Gallium-carboxylate trimer molecular building block (TMBB) and 3,3',5,5'-azobenzenetetracarboxylate. The oxygen-centered gallium carboxylate TMBB, [Ga$_3$O(CO$_2$)$_6$(H$_2$O)$_3$] comprises a 6-connected node having trigonal-prismatic geometry networked by 3,3',5,5'-azobenzenetetracarboxylate tetradentate ligands.

Figure 4A:
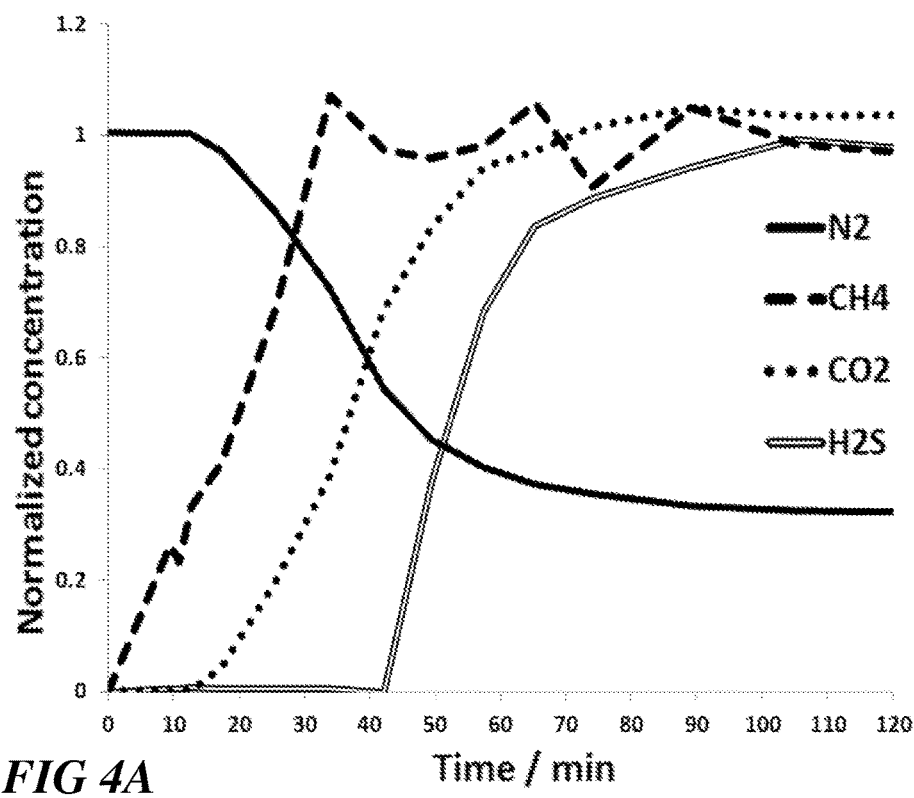
FIG. 4A illustrates a $H_2S/CO_2/N_2/CH_4$:1/30/10/59 mixture adsorption data for a Ga-soc-MOF, according to one or more embodiments.
Figure 4B:
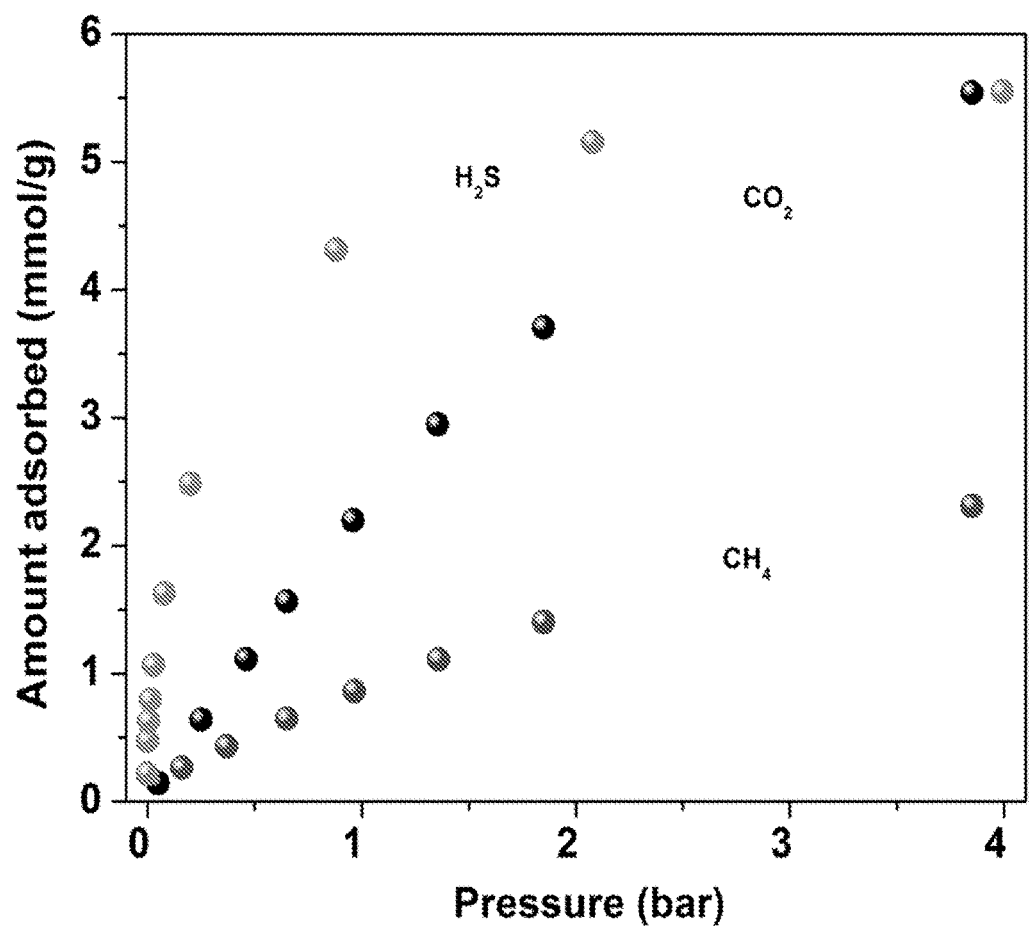
FIG. 4B illustrates $CO_2$, $H_2S$, and $CH_4$ adsorption isotherms at 25° C. for the Ga-soc-MOF, according to one or more embodiments.

FIG. 4A illustrates H$_2$S/CO$_2$/N$_2$/CH$_4$:1/30/10/59 mixture adsorption experiments performed in a column breakthrough set-up. The Ga-soc-MOF adsorbed H$_2$S and CO$_2$ from CH$_4$ with high selectivity. The 1% (of 15 ml/min) H$_2$S was retained for 40 min, while 30% CO$_2$ (of 15 ml/min) was retained for about 15 minutes, indicative of the potential of selective removal of H$_2$S and CO$_2$ from CH$_4$ containing gas streams. FIG. 4B illustrates CO$_2$, H$_2$S, and CH$_4$ adsorption isotherms at 25° C. for the Ga-soc-MOF, indicating selectivity for CO$_2$ and H$_2$S over CH$_4$.

What is claimed is:

1. A method of removing one or more compounds from a fluid, the method comprising:
   contacting one or more metal organic framework (MOF) compositions with a fluid, wherein each of the one or more MOF compositions are represented by the formula: M-soc-MOF, wherein M is a metal selected from gallium, iron, scandium, and aluminum, and soc is a square-octahedral topology; and
   sorbing H$_2$S and one or more condensable hydrocarbons, and optionally CO$_2$, from the fluid, wherein the sorbing includes absorbing and the condensable hydrocarbons are selected from ethane, propane, butane, pentane, and hexane.

2. The method of claim 1, wherein the M-soc-MOF comprises tetradentate organic ligands.

3. The method of claim 2, wherein the tetradentate organic ligands comprise tetracarboxylate ligands.

4. The method of claim 1, wherein the M-soc-MOF comprises rectangular planar organic ligands.

5. The method of claim 1, wherein the M-soc-MOF comprises amidetetracarboxylate or 3,3',5,5'-azobenzenetetracarboxylate organic ligands.

6. The method of claim 1, wherein the M-soc-MOF comprises two distinct types of channels.

7. The method of claim 6, wherein one of the two types of channels is hydrophilic.

8. The method of claim 1, wherein the M-soc-MOF comprises a plurality of 6-connected trimer molecular building blocks networked by organic ligands.

9. The method of claim 8, wherein each of the trimer molecular building blocks comprises three metal carboxylate octahedra.

10. The method of claim 9, wherein each of the metal carboxylate octahedral of a trimer molecular building block are metal-centered and share one central μ$_3$-oxo anion.

11. The method of claim 9, wherein the apical position of each metal carboxylate octahedral is occupied by a terminal water molecule.

12. The method of claim 1, wherein contacting comprises mixing, bringing in close proximity, chemically contacting, physically contacting or combinations thereof.

13. The method of claim 1, wherein sorbing further comprises adsorbing.

14. The method of claim 1, wherein the fluid comprises one or more of natural gas and biogas.

15. The method of claim 1, wherein the H$_2$S and one or more condensable hydrocarbons, and optionally the CO$_2$, are sorbed simultaneously.

16. The method of claim 1, wherein the H$_2$S and one or more condensable hydrocarbons, and optionally the CO$_2$, are sorbed sequentially.

17. A method of removing one or more compounds from a fluid, the method comprising:
   contacting one or more metal organic framework (MOF) compositions with a fluid, wherein each of the one or more MOF compositions are represented by the formula: M-soc-MOF, wherein M is a metal and soc is a square-octahedral topology; and
   sorbing two or more of CO$_2$, H$_2$S, and condensable hydrocarbon sequentially from the fluid, wherein the condensable hydrocarbon includes one or more of ethane, propane, butane, pentane, and hexane.

18. The method of claim 17, wherein the metal is selected from gallium, iron, scandium, and aluminum.

19. A method of removing one or more compounds from a fluid, the method comprising:
   contacting one or more metal organic framework (MOF) compositions with a fluid, wherein each of the one or more MOF compositions are represented by the formula: M-soc-MOF, wherein the metal is selected from gallium, indium, iron, scandium, and aluminum and soc is a square-octahedral topology; and
   sorbing two or more of CO$_2$, H$_2$S, and condensable hydrocarbon sequentially from the fluid, wherein the condensable hydrocarbon includes one or more of ethane, propane, butane, pentane, and hexane.

* * * * *